(12) United States Patent
Ikeuchi et al.

(10) Patent No.: US 10,245,933 B2
(45) Date of Patent: Apr. 2, 2019

(54) VEHICLE

(71) Applicant: HONDA MOTOR CO., LTD., Tokyo (JP)

(72) Inventors: Toshiyuki Ikeuchi, Wako (JP); Tetsuya Takezawa, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 19 days.

(21) Appl. No.: 15/523,721

(22) PCT Filed: Oct. 22, 2015

(86) PCT No.: PCT/JP2015/079876
§ 371 (c)(1),
(2) Date: May 2, 2017

(87) PCT Pub. No.: WO2016/072287
PCT Pub. Date: May 12, 2016

(65) Prior Publication Data
US 2017/0320383 A1    Nov. 9, 2017

(30) Foreign Application Priority Data

Nov. 7, 2014   (JP) .................................. 2014-227047

(51) Int. Cl.
*B60K 1/04*        (2006.01)
*B62D 25/20*      (2006.01)
(Continued)

(52) U.S. Cl.
CPC ............ *B60K 1/04* (2013.01); *B60L 11/1877* (2013.01); *B62D 25/20* (2013.01);
(Continued)

(58) Field of Classification Search
CPC ............ B60K 1/04; B60K 2001/0422; B60K 2001/0438; B60K 2001/0427
See application file for complete search history.

(56) References Cited

U.S. PATENT DOCUMENTS

| | | | |
|---|---|---|---|
| 6,811,197 B1 * | 11/2004 | Grabowski | B60R 7/04 180/68.5 |
| 7,900,728 B2 * | 3/2011 | Suzuki | B60K 1/04 180/65.29 |

(Continued)

FOREIGN PATENT DOCUMENTS

| | | |
|---|---|---|
| CN | 102938450 A | 2/2013 |
| JP | 2006-232237 A | 9/2006 |

(Continued)

OTHER PUBLICATIONS

International Search Report dated Jan. 12, 2016, issued in counterpart of International Application No. PCT/JP2015/079876 (2 pages).
(Continued)

*Primary Examiner* — Katy M Ebner
(74) *Attorney, Agent, or Firm* — Westerman, Hattori, Daniels & Adrian, LLP

(57) ABSTRACT

A vehicle includes: a center tunnel which is formed on a floor panel so as to extend in a front-rear direction; a high-voltage battery which is disposed on the center tunnel; and a frame member which holds the high-voltage battery, wherein leg portions are provided on a bottom portion of the frame member so as to extend obliquely downwards, and wherein the frame member is fastened to inclined surfaces of the center tunnel via the leg portions.

5 Claims, 16 Drawing Sheets

(51) Int. Cl.
 B60L 11/18 (2006.01)
 B60L 15/00 (2006.01)
(52) U.S. Cl.
 CPC ..... *B60K 2001/0427* (2013.01); *B60L 15/007* (2013.01); *B60L 2210/10* (2013.01); *B60Y 2306/01* (2013.01); *B60Y 2410/10* (2013.01)

(56) References Cited

U.S. PATENT DOCUMENTS

| | | | | |
|---|---|---|---|---|
| 2007/0284167 | A1* | 12/2007 | Watanabe | B60L 3/0046 180/68.5 |
| 2008/0315629 | A1* | 12/2008 | Abe | B62D 21/157 296/193.07 |
| 2010/0001553 | A1* | 1/2010 | Yoda | B60K 1/04 296/193.07 |
| 2010/0089675 | A1* | 4/2010 | Nagata | B60K 1/04 180/68.5 |
| 2010/0213741 | A1* | 8/2010 | Suzuki | B60K 1/04 296/193.07 |
| 2010/0244489 | A1* | 9/2010 | Shiono | B60N 2/4235 296/193.01 |
| 2011/0132676 | A1* | 6/2011 | Kodaira | B60K 1/04 180/65.51 |
| 2012/0118653 | A1* | 5/2012 | Ogihara | B60K 1/04 180/65.8 |
| 2013/0078496 | A1* | 3/2013 | Lim | B60K 1/04 429/120 |
| 2013/0140101 | A1* | 6/2013 | Lim | B60K 1/04 180/68.5 |

FOREIGN PATENT DOCUMENTS

| | | |
|---|---|---|
| JP | 2009-35094 A | 2/2009 |
| JP | 2009-119890 A | 6/2009 |
| JP | 2010-188965 A | 9/2010 |
| JP | 2010-228561 A | 10/2010 |
| JP | 4979545 B2 | 7/2012 |
| JP | 2013-86564 A | 5/2013 |
| JP | 2013-116724 A | 6/2013 |

OTHER PUBLICATIONS

Office Action dated Sep. 30, 2018, issued in counterpart Chinese application No. 201580060055.4. (7 pages).

* cited by examiner

VEHICLE

TECHNICAL FIELD

The present invention relates to a vehicle and more particularly to a vehicle in which a high-voltage battery is disposed on a center tunnel which is formed on a floor panel.

BACKGROUND ART

In a hybrid electric vehicle and an electric vehicle, a high-voltage battery is mounted as a drive source for an electric motor. In recent years, it has been under study to dispose a high-voltage battery within a passenger compartment, and battery installation mechanisms have been proposed in which a high-voltage battery is disposed between a pair of front seats which are aligned side by side in a left-right direction of a vehicle (for example, refer to Patent Literatures 1, 2).

Patent Literature 1 discloses an energy absorbing construction of a battery installing portion in which an impact absorbing duct which connects a body floor and a center console box together is provided. The impact absorbing duct is bent to be deformed when a load of a predetermined value or greater is inputted from the center console box at the time of a lateral collision to thereby absorb the kinetic energy of the center console box. Patent Literature 2 discloses a positioning mechanism configured to position a battery unit disposed between front seats in relation to a vehicle body. The positioning mechanism includes a pin which is provided on the battery unit and a guide member which is provided on a vehicle body and configured to guide the pin towards a groove into which the pin is inserted, and is designed to facilitate the positioning of the battery unit when the battery unit is built in.

PRIOR ART LITERATURE

Patent Literature

Patent Literature 1: JP-A-2009-35094
Patent Literature 2: JP-A-2013-86564

SUMMARY OF THE INVENTION

Problem that the Invention is to Solve

According to Patent Literature 1, however, an upper wall portion and a lower wall portion of the impact absorbing duct have flange portions which are provided so as to extend further transversely outwards than vertical wall portions. The flange portion of the upper wall portion is superposed on a flange portion of the center console box and is fixed thereto with a fastening device from a vertical direction, and the flange portion of the lower wall portion is fixed to a body floor with a fastening device from the vertical direction. This increases a transverse length of the impact absorbing duct, making it difficult to dispose the center console box in a compact fashion. In addition, distances from the center console box to the fastening points are long, leading to fears that the supporting rigidity of the center console box is reduced. Patent Literature 2 is the invention designed to facilitate the positioning of the battery unit when the battery unit is built in and states nothing about the construction of installing the high-voltage battery on the center tunnel in a compact fashion and with high supporting rigidity.

The invention provides a vehicle in which not only can a high-voltage battery be installed on a center tunnel in a compact fashion but also the high-voltage battery can be protected effectively from an impact generated by a lateral collision.

Means for Solving the Problem

The invention provides the following aspects.
According to a first aspect of the invention, there is provided a vehicle (e.g., a vehicle 10 in embodiment) including:
a center tunnel (e.g., a center tunnel 12 in embodiment) which is formed on a floor panel (e.g., a floor panel 11 in embodiment) so as to extend in a front-rear direction;
a high-voltage battery (e.g., high-voltage batteries 32 in embodiment) which is disposed on the center tunnel; and
a frame member (e.g., a lower frame member 31D in embodiment) which holds the high-voltage battery, wherein
leg portions (e.g., front leg portions 48F and rear leg portions 48R in embodiment) are provided on a bottom portion (e.g., a bottom surface 40 in embodiment) of the frame member so as to extend obliquely downwards, and wherein
the frame member is fastened to inclined surfaces (e.g., side inclined surfaces 12b in embodiment) of the center tunnel via the leg portions.

According to a second aspect, in the first aspect,
the frame member holds a high-voltage system equipment (e.g., high-voltage system equipment 35 in embodiment) which is disposed either forwards or rearwards of the high-voltage battery together with the high-voltage battery, and
the bottom portion is provided with a pair of left and right first leg portions (e.g., the rear leg portions 48R in embodiment) which are disposed below the high-voltage battery, and a pair of left and right second leg portions (e.g., the front leg portions 48F) which are disposed below the high-voltage system equipment.

According to a third aspect, in the second aspect,
a cross member (e.g., a left cross member 16L, a center cross member 16M and a right cross member 16R in embodiment) is provided between the first leg portions and the second leg portions.

According to a fourth aspect, in the third aspect,
the cross member includes:
a center cross member (e.g., the center cross member 16M in embodiment) which is disposed in the center tunnel;
a left cross member (e.g., the left cross member 16L in embodiment) which connects a left side sill (e.g., a left side sill 13L in embodiment) and the center tunnel together; and
a right cross member (e.g., the right cross member 16R in embodiment) which connects a right side sill (e.g., a right side sill 13R in embodiment) and the center tunnel together, and
the left cross member, the center cross member, and the right cross member are connected together via the center tunnel in a transverse direction.

According to a fifth aspect, in any one of the first to fourth aspects,
the frame member is fastened to the inclined surfaces of the center tunnel via the leg portions by means of a fastening member (e.g., bolts 64 in embodiment), and
the fastening member is positioned inwards of an outermost portion (e.g., a vertical side surface 12d in embodiment) of the center tunnel in a transverse direction.

Advantages of the Invention

According to the first aspect, a width of a disposing area of the high-voltage battery including the fastening portion can be narrowed, whereby the high-voltage battery can be disposed on the center tunnel in a compact fashion. A transverse distance to the fastening point becomes short, whereby the supporting rigidity of the high-voltage battery is improved. Since the leg portions are inclined downwards, the transverse dimension errors of the center tunnel and the leg portions of the flame member can easily be absorbed, thereby facilitating the installation of the high-voltage battery.

According to the second aspect, since the high-voltage battery and the high-voltage system equipment are fastened and held strongly and rigidly in the vicinity thereof the high-voltage battery and the high-voltage system equipment can be protected from a side impact.

According to the third aspect, since the cross member is provided between the first leg portions and the second leg portions, an impact generated by a lateral collision can be absorbed by the cross member to thereby suppress the deformation of the leg portions, whereby the high-voltage battery and the high-voltage system equipment can be protected.

According to the fourth aspect, an impact generated by a lateral collision can be absorbed by the cross members which are connected together strongly and rigidly via the center tunnel to thereby suppress the deformation of the leg portions, whereby the high-voltage battery and the high-voltage system equipment can be protected.

According to the fifth aspect, the high-voltage battery can be disposed on the center tunnel in a compact fashion.

MODE FOR CARRYING OUT THE INVENTION

Figure 1:
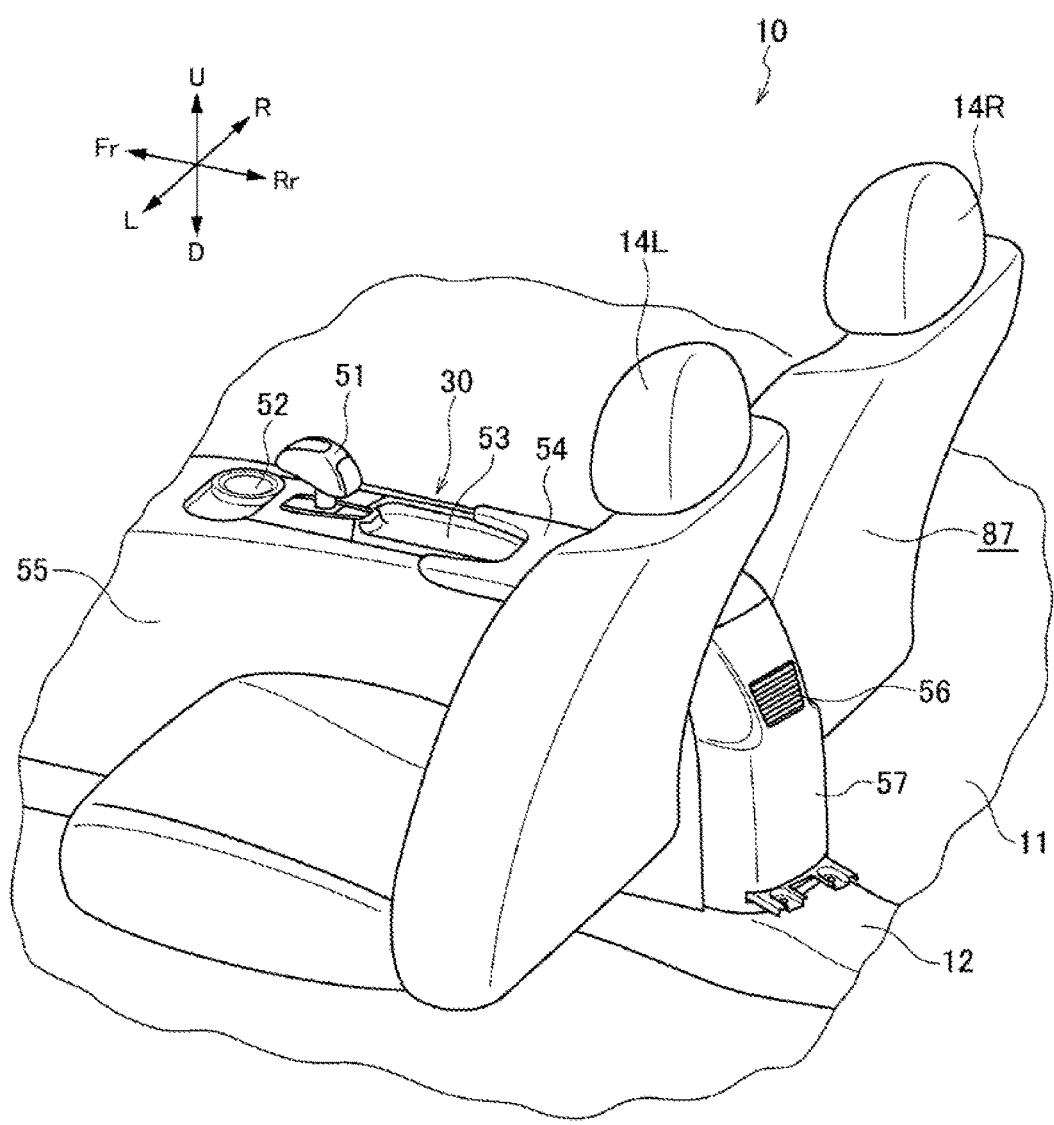
FIG. 1 is a perspective view showing front seats and a center console which is disposed between the front seats of a vehicle according to an embodiment of the invention.

Hereinafter, a vehicle according to one embodiment of the invention will be described by reference to the drawings. The drawings should be seen in a direction in which given reference numerals look normal. In the following description, front, rear, left, right, up and down denote accordingly directions as seen from a driver of the vehicle. The front, rear, left, right, up and down sides of the vehicle are denoted by Fr, Rr, L, R, U and D, respectively.

Figure 2:
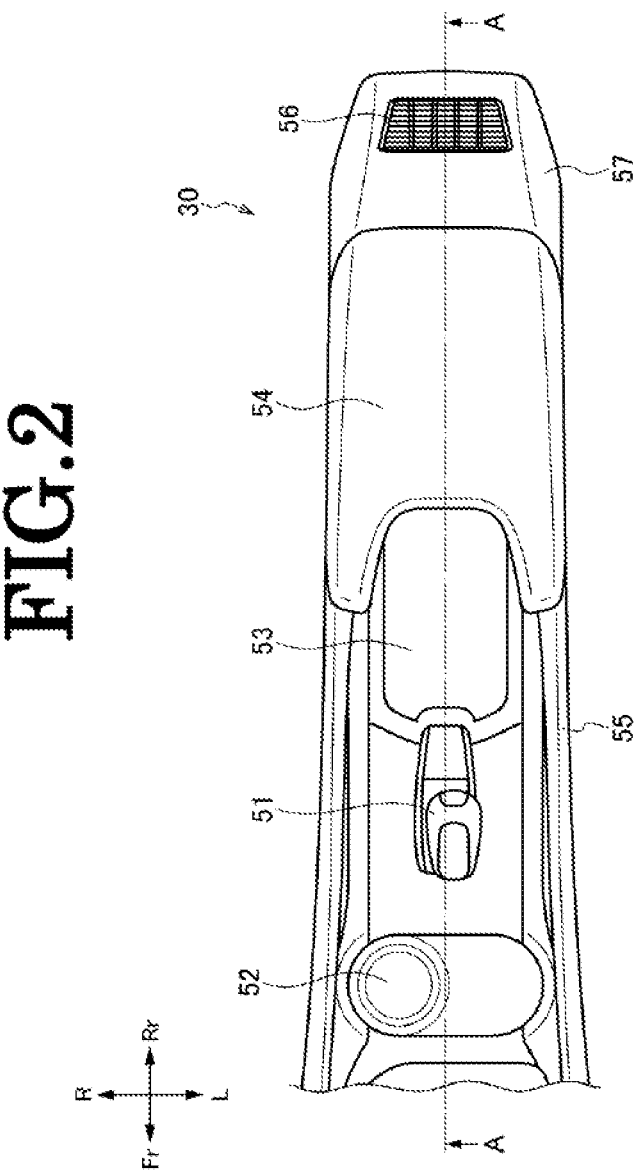
FIG. 2 is a plan view of the center console.
Figure 3:
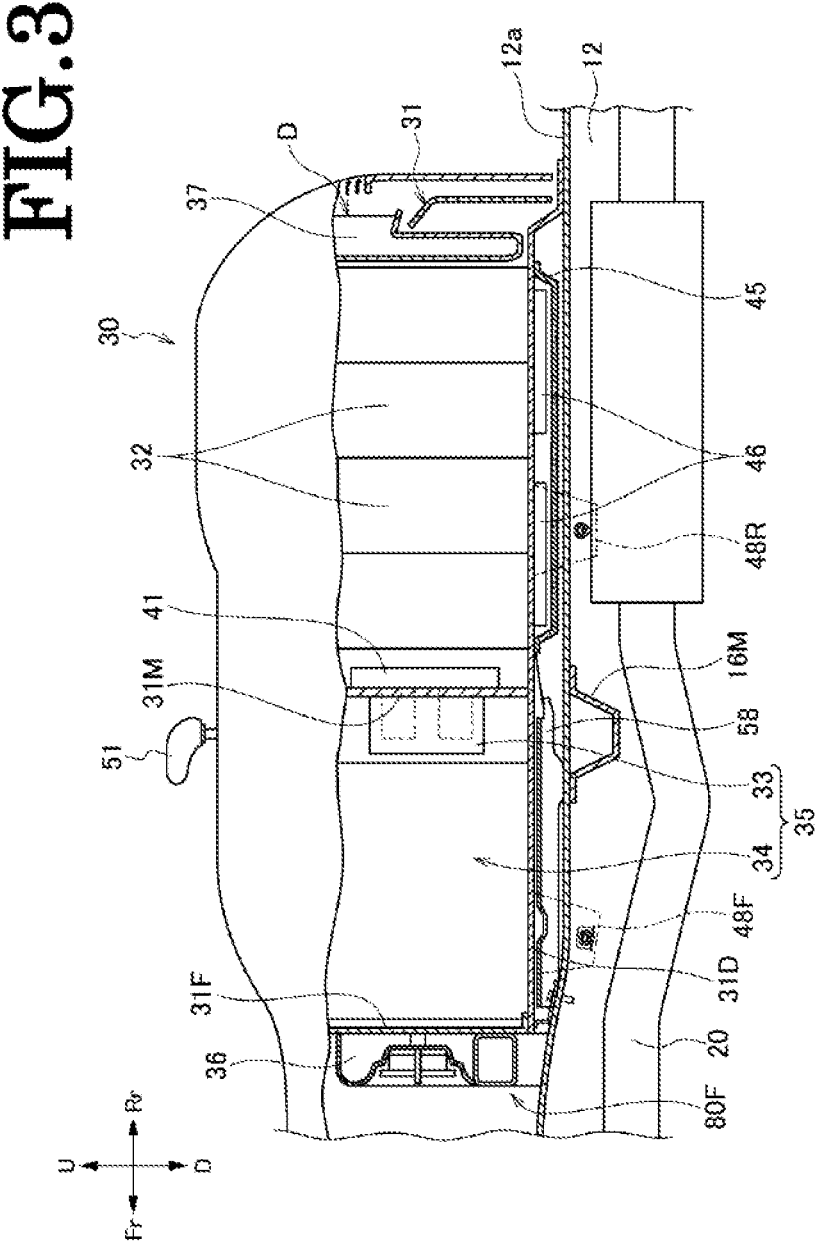
FIG. 3 is a partial sectional view taken along a line A-A in FIG. 2.
Figure 4:
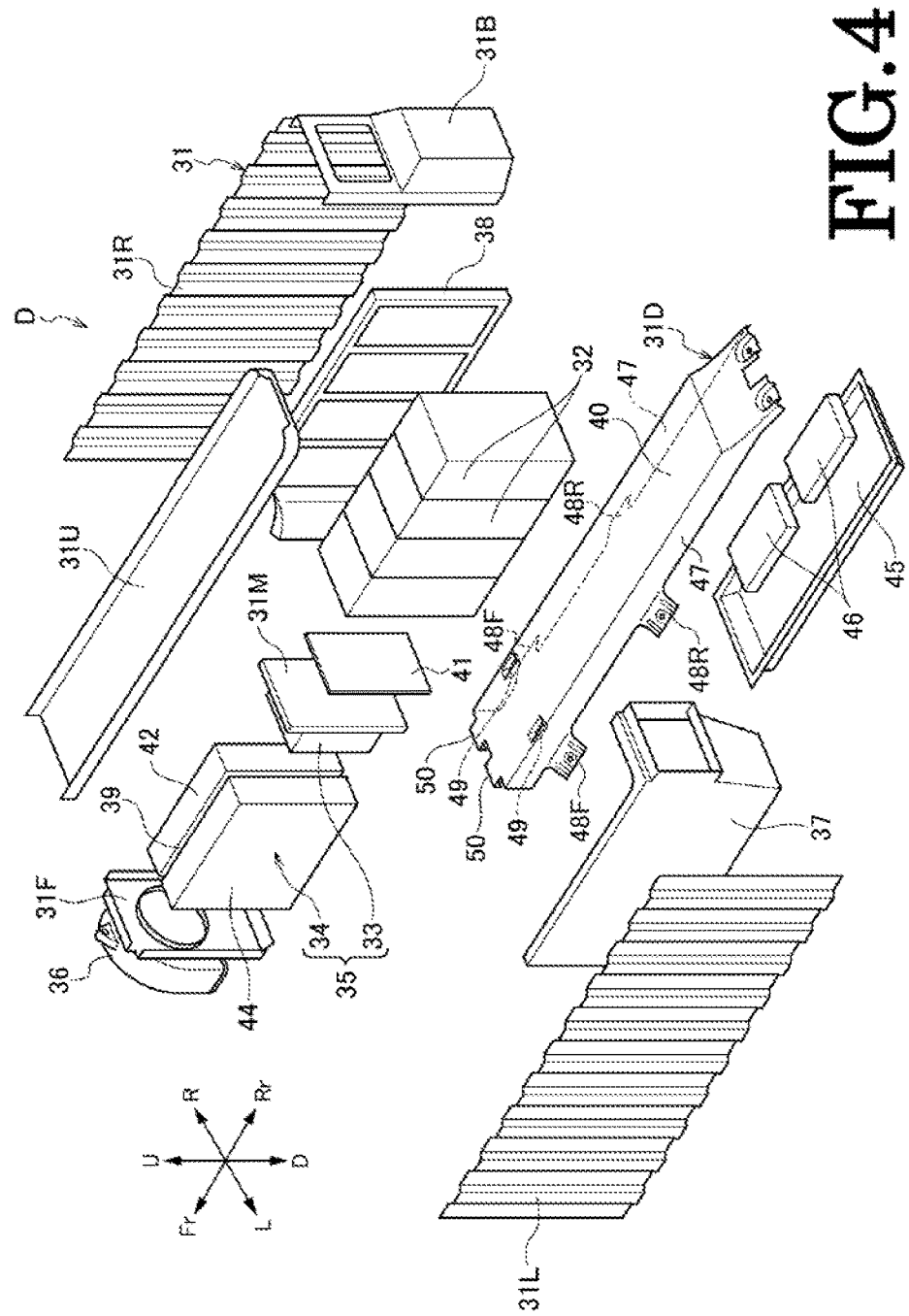
FIG. 4 is an exploded perspective view of an electric device accommodated in the center console.

FIG. 1 is a perspective view showing front seats and a center console which is disposed between the front seats of the vehicle according to the embodiment of the invention, FIG. 2 is a plan view of the center console. FIG. 3 is a partial sectional view of the center console, FIG. 4 is an exploded perspective view of an electric device D, FIG. 5 is a perspective view of a main part when a passenger compartment of the vehicle is seen from a left rear side thereof, and FIG. 6 is a vertical sectional view of the electric device which is fixed on to the center tunnel.

As shown in FIGS. 1 to 3, 5 and 6, in the vehicle 10 of this embodiment, a center console 30 is disposed on a center tunnel 12 having a substantially trapezoidal cross section which is formed on a floor panel 11 between a left front seat 14L and a right front seat 14R so as to extend in a front-rear direction, and an electric device D is installed in the center console 30.

<Floor Structure>

Figure 5:
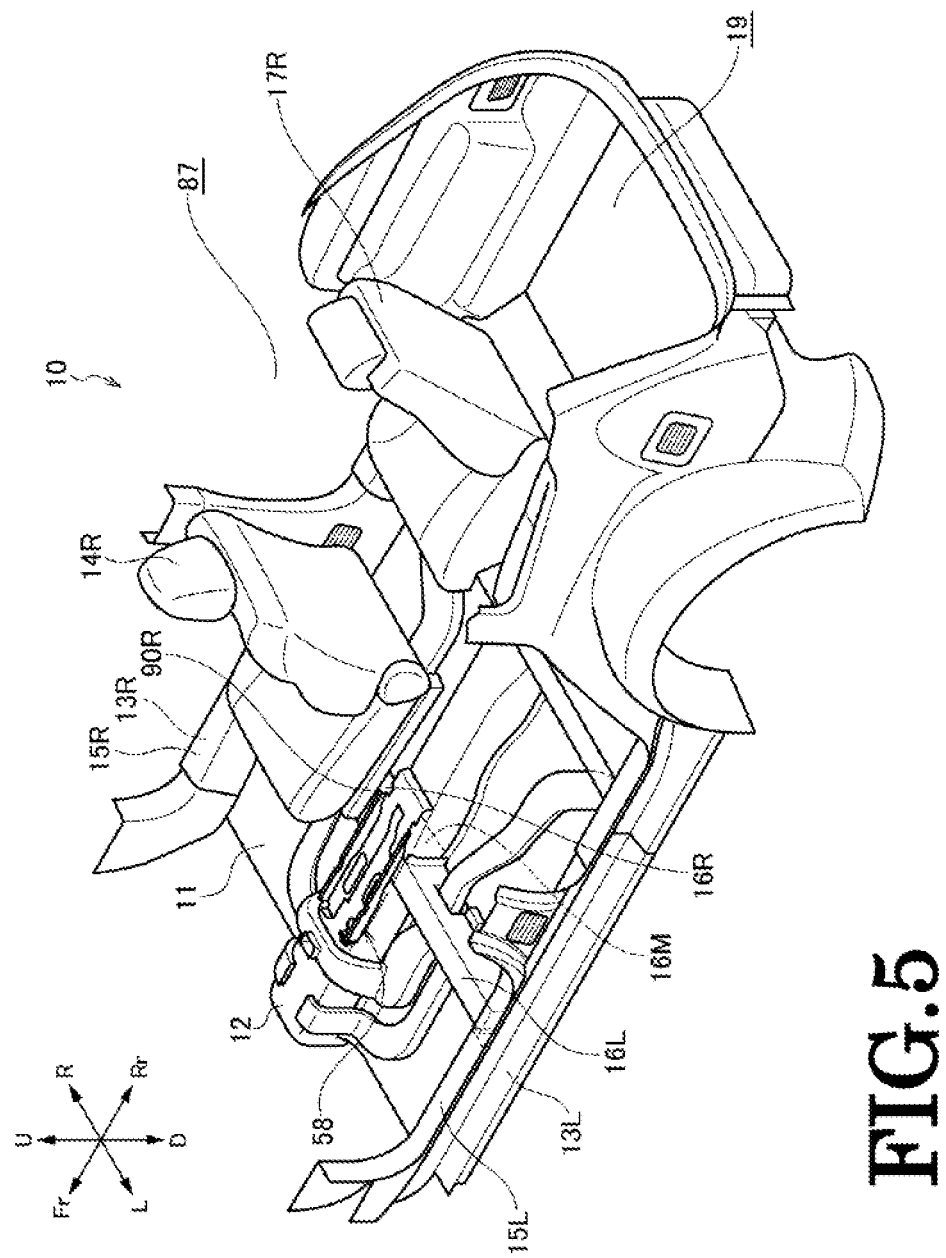
FIG. 5 is a perspective view of a main part when a passenger compartment of the vehicle is seen from a left rear side thereof.
Figure 6:
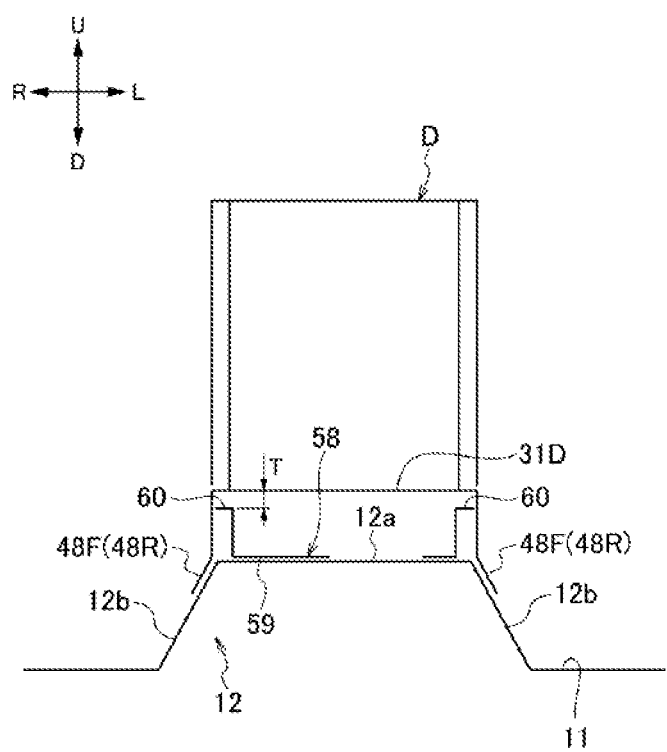
FIG. 6 is a vertical sectional view of the electric device which is fixed on to the center console.

As shown in FIG. 5, the vehicle 10 has the floor panel 11, the center tunnel 12 having the substantially trapezoidal cross section which is formed on the floor panel 11 between the left front seat 14L (refer to FIG. 1) and the right front seat 14R so as to extend in the front-rear direction, a left side sill 13L and a right side sill 13R which extend in the front-rear direction at left- and right-hand sides of the vehicle 10, a left side trim 15L which covers the left side still 13L, and a right side trim 15R which covers the right side sill 13R. In the passenger compartment 87, a pair of left rear seat (not shown) and right rear seat 17R is disposed behind the pair of the left front seat 14L and the right front seat 14R, and further, a luggage compartment 19 is provided behind the left rear seat (not shown) and the right rear seat 17R.

A left side wall of the center tunnel 12 and the left side sill 13L are connected together by a left cross member 16L which extends in a left-right direction of the vehicle (hereinafter, referred to as a transverse direction of the vehicle). A right side wall of the center tunnel 12 and the right side sill 13R are connected together by a right cross member 16R which extends in the left-right direction of the vehicle. A center cross member 16M is provided in the center tunnel 12, too, in a position which coincides with the positions of the left cross member 16L and the right cross member 16R so as to reinforce the center tunnel 12 (refer to FIG. 3). The left cross member 16L, the center cross member 16M and the right cross member 16R are connected together via the center tunnel 12 in the transverse direction. The left front seat 14L is disposed on an upper surface of the left cross member 16L via seat rails (not shown). The right front seat 14R is disposed on an upper surface of the right cross member 16R via seat rails 90R. A guide member 58 is fixed to an upper surface 12a of the center tunnel 12, and this guide member 58 positions the electric device D by guiding a frame member 31 which holds the electric device D when the electric device is built in. An exhaust pipe 20, which is connected to an internal combustion engine, not shown, at one end thereof is provided m the center tunnel 12 so as to extend in the front-rear direction (refer to FIG. 3). In figures from FIG. 3 on, the exhaust pipe 20 and the center cross member 16M are omitted from illustration.

<Center Console>

As shown in FIGS. 1 and 2, the center console 30 is disposed between the left front seat 14L and the right front seat 14R, and an interior space thereof is covered by an external cover 55 on an upper surface of which a cup holder 52, a shift knob 51, a small article storage tray 53 and an armrest 54 for front seat passengers are provided sequentially in that order from the front. A cover member 57 in which an intake grille 56 is provided is attached to a rear end of the external cover 55. The intake grille 56 takes in air inside the passenger compartment 87 as cooling air for the electric device D when a cooling fan 36, which will be described later, is activated.

<Electric Device>

As shown in FIG. 4, the electric device D includes high-voltage batteries 32, an ECU 41, and high-voltage system equipment 35, and these high-voltage batteries 32, ECU 41, and high-voltage system equipment 35 are made into a unit by being held by the frame member 31. The frame member 31 is made up as a result of an upper frame member 31U, a lower frame member 31D, and a middle frame member 31M which joins the upper frame member 31U and the lower frame member 31D together being surrounded by a front cover member 31F, a left cover member 31L, a right cover member 31R and a rear cover member 31B. The lower frame member 31D will be described in detail later.

The high-voltage batteries 32, the ECU 41 and the high-voltage system equipment 35 are disposed sequentially in this order from the rear of the vehicle. The high-voltage system equipment 35 includes a junction box 33 which is attached to a front surface of the middle frame member 31M and a converter (PCU) 34 which is disposed ahead of the junction box 33 to convert the voltages of the high-voltage batteries 32. The ECU 41 described above is attached to a rear surface of the middle frame member 31M. The converter (PCU) 34 includes a DC-DC converter 42 and an inverter 44, and these DC-DC converter 42 and inverter 44 are disposed transversely side by side in a space defined between the front cover member 31F and the junction box 33.

An intake duct 37 is attached to left side surfaces of the high-voltage batteries 32 to be disposed between the high-voltage batteries 32 and the left cover member 31L, and a discharge duct 38 is attached to right side surfaces of the high-voltage batteries 32 to be disposed between the high-voltage batteries 32 and the right cover member 31R. Cell voltage sensors (CVS) 46 are fixed to a lower surface of the lower frame member 31D and are covered by a CVS cover 45. The electric device D is fixed to the center tunnel 12 as a result of the lower frame member 31D being fastened to the center tunnel 12 with bolts 64 (refer to FIG. 16). The cooling fan 36 is attached to the front surface of the front cover member 31F. Air taken in from the intake grille 56 of the center console 30 by the cooling fan 36 passes sequentially through the intake duct 37, the high-voltage batteries 32, and the discharge duct 38 in that order, then passes from the discharge duct 38 through a cooling passageway 39 defined between the DC-DC converter 42 and the inverter 44, and is then sucked by the cooling fan 36 to be discharged from the cooling fan 36 into a discharge flow path 80F. The discharge flow path 80F is a flow path which discharges cooling air discharged from the cooling fan 36 into the passenger compartment 87 through a side trim. Since the discharge flow path 80F is not related directly to the invention, the detailed description thereof will be omitted here.

<Lower Frame>

As shown in FIG. 4, the lower frame member 31D has a bottom surface 40 having a substantially rectangular plate-like shape, a pair of left and right side wall portions 47 which extend downwards from both sides of the bottom surface 40, a pair of left and right front leg portions 48F which extend obliquely downwards from front portions of the pair of left and right side wall portions 47, a pair of left and right rear leg portions 48R which extend obliquely downwards from rear portions of the pair of left and right side wall portions 47, a pair of projecting portions 49 which are formed at a front portion of the bottom surface 40 so as to lie adjacent to the pair of left and right side wall portions 47 and which project downwards from the bottom surface 40, and abutment portions 50 which are formed so as to be bent downwards from a front end of the bottom surface 40.

The front leg portions 48F and the rear leg portions 48R are bent at the same angle as an angle at which side inclined surfaces 12b of the center tunnel 12 are inclined, and as will be described later, the front leg portions 48F and the rear leg portions 48R are fastened to the side inclined surfaces 12b of the center tunnel 12 with the bolts 64 (refer to FIG. 6). As shown in FIG. 3, the pair of left and right front leg portions 48F are provided below the high-voltage system equipment 35, and the pair of left and right rear leg portions 48R are provided below the high-voltage batteries 32 and are fastened to the side inclined surfaces 12b of the center tunnel 12 with the bolts 64. By doing so, the lower frame member 31D, that is, the electric device D is fixed onto the center tunnel 12.

Specifically, the electric device D is disposed on the center tunnel 12 so that the high-voltage system equipment 35 or, more specifically, the junction box 33 is positioned above the center cross member 16M, and the front leg portions 48F and the rear leg portions 48R which are disposed in the front-rear direction across the center cross member 16M are fastened to the center tunnel 12. By doing so, the junction box 33 is disposed above the center cross member 16M in such a way as to overlap the center cross member 16M as seen from thereabove.

In the constituent members making up the electric device D, the high-voltage batteries 32 and the high-voltage system equipment 35 or, particularly, the junction box 33 are important safety parts and need to be protected securely even when the vehicle is involved in a collision. The electric device D is disposed on the center tunnel 12 whose mechanical strength is reinforced by the center cross member 16M and is fastened to the center tunnel 12 at the front leg portions 48F and the rear leg portions 48R which are disposed so as to sandwich the center cross member 16M therebetween, whereby the high-voltage batteries 32 and the high-voltage system equipment 35 are protected.

<Guide Member>

Figure 7:
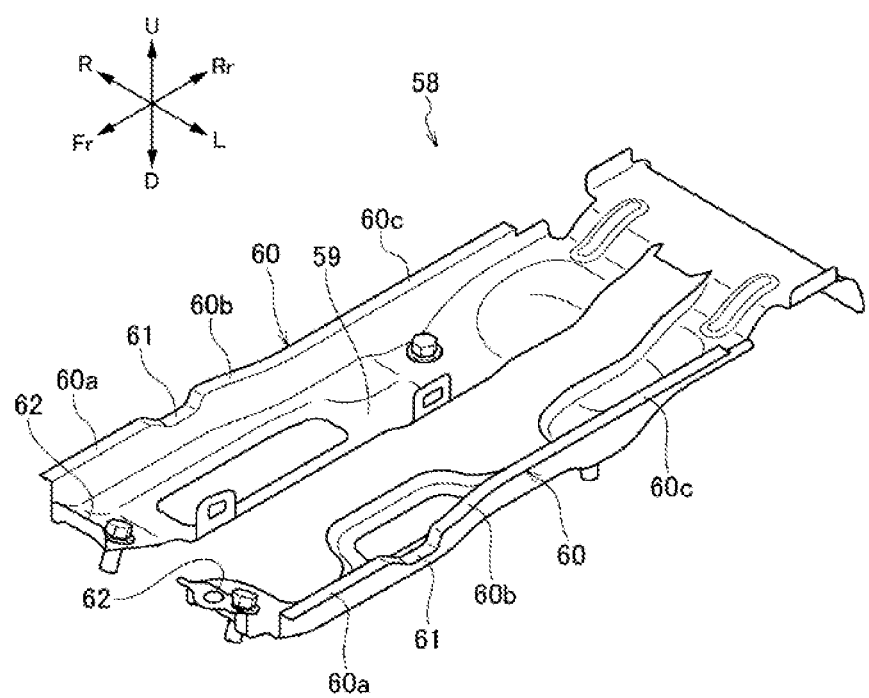
FIG. 7 is a perspective view of a guide member.

Next, the guide member 58 which is fixed on to the center tunnel 12 will be described by reference to FIG. 7. FIG. 7 is a perspective view of the guide member 58.

The guide member 58 has an attaching portion 59 having a substantially U-shaped plate, a pair of guide rails 60 which rise from left and right side edges of the attaching portion 59 and which are then bent to the left and right, a pair of recessed portions 61 which are formed on upper surfaces of the guide rails 60, and stoppers 62 which are bent upwards from a front end of the attaching portion 59. The stoppers 62 are brought into abutment with the abutment portions 50 of the lower frame member 31D to thereby restrict a further forward movement of the electric device D.

Figure 11:
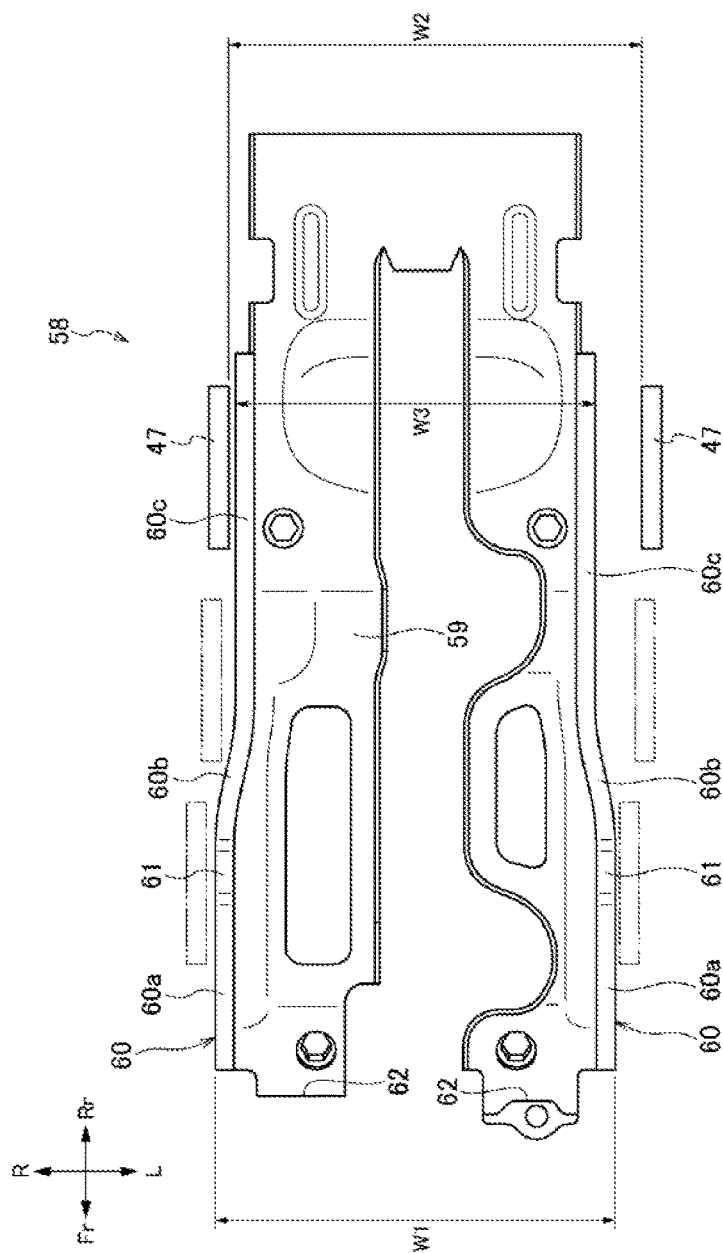
FIG. 11 is an explanatory drawing showing a state where the frame member is guided by the guide rails of the guide member whereby the electric device is positioned in the left-right direction.

Referring to FIG. 11, too, the guide rails 60 have width increasing portions 60b which expand gradually away from each other as they extend from the rear to the front so as to define a transversely increasing space therebetween. The guide rails 60 also have wide width portions 60a formed forwards of the width increasing portions 60b so as to define a transverse space W1 therebetween and narrow width portions 60c formed rearwards of the width increasing portions 60b so as to define a narrow transverse space W3 therebetween. The transverse space W1 defined between the wide width portions 60a is set narrower than a transverse space W2 which is defined between inner sides of the side wall portions 47 of the lower frame member 31D. Namely, in building the electric device D on the center tunnel 12, the pair of guide rails 60 are disposed inside the pair of side wall portions 47 of the lower frame member 31D.

<Building of Electric Device>

Figure 8:
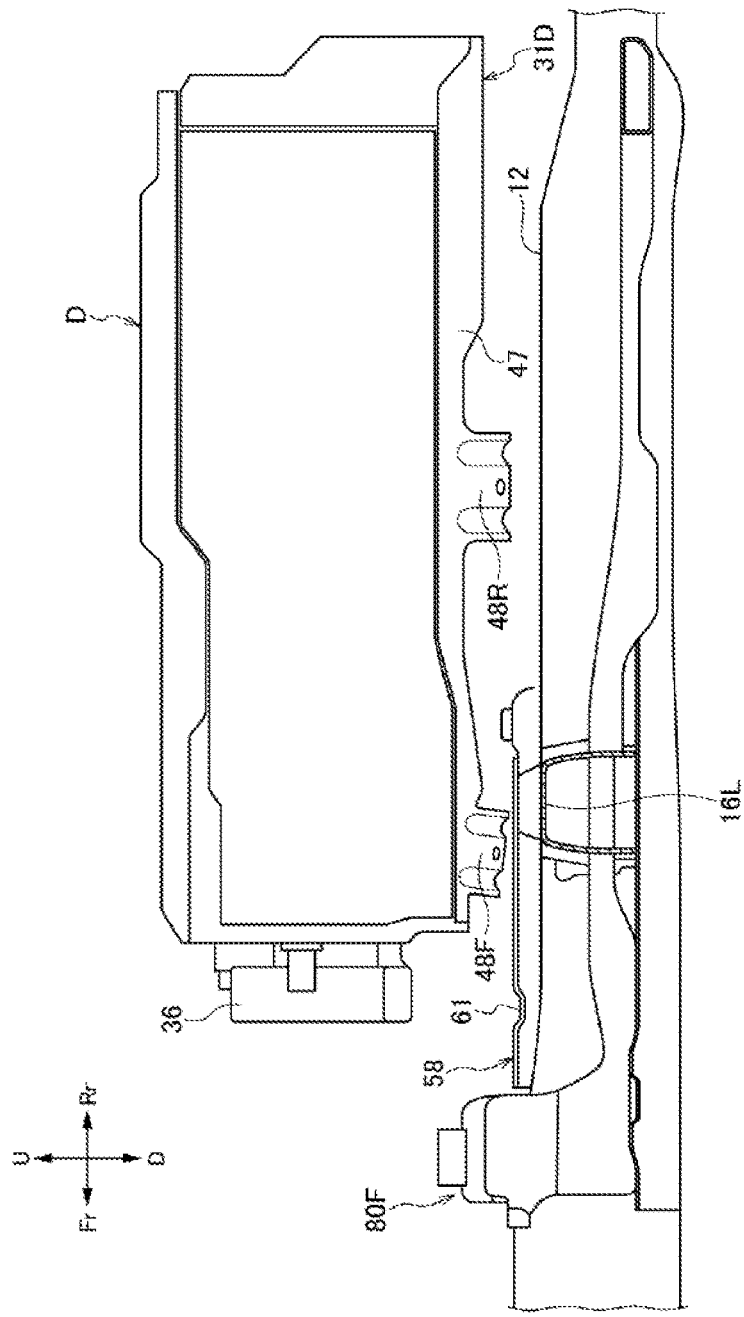
FIG. 8 is a left side view showing a state where the electric device is conveyed on to the center tunnel so as to be built thereon.
Figure 9:
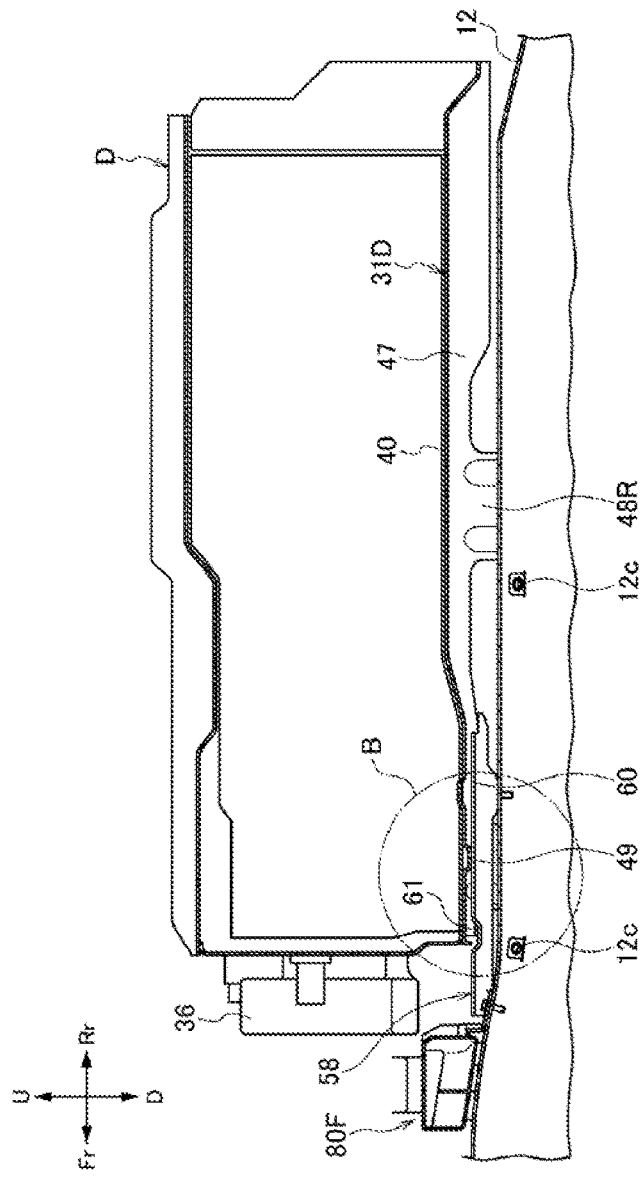
FIG. 9 is a left side view showing a state where the electric device is lowered so that projecting portions of a frame member are brought into contact with guide rails on a guide member.
Figure 10:
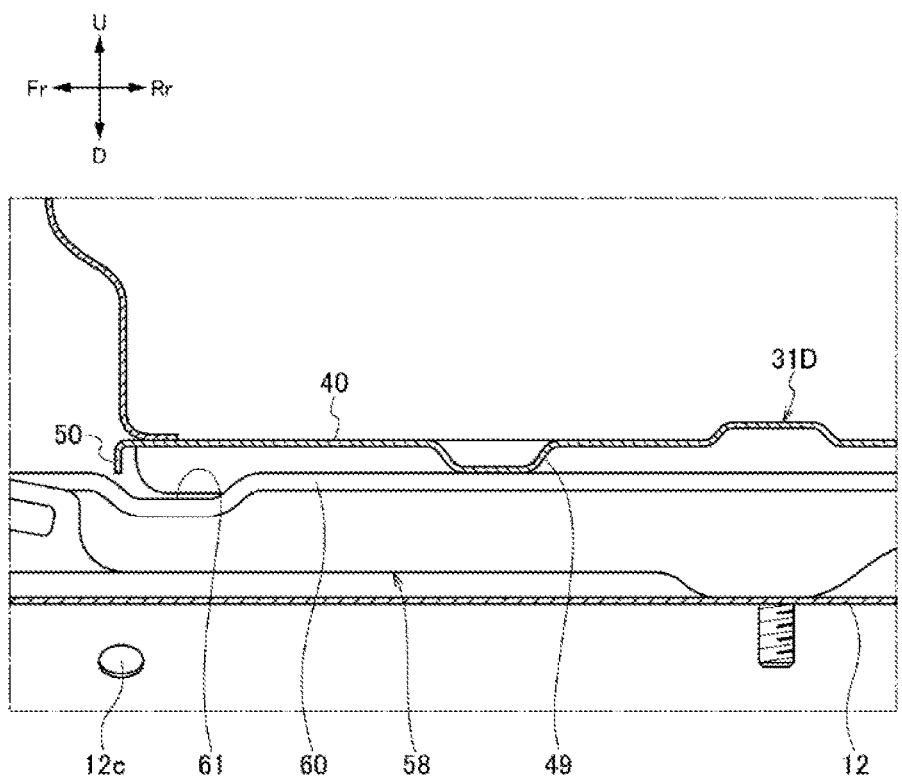
FIG. 10 is an enlarged view of a portion surrounded by a circle B shown in FIG. 9.
Figure 12:
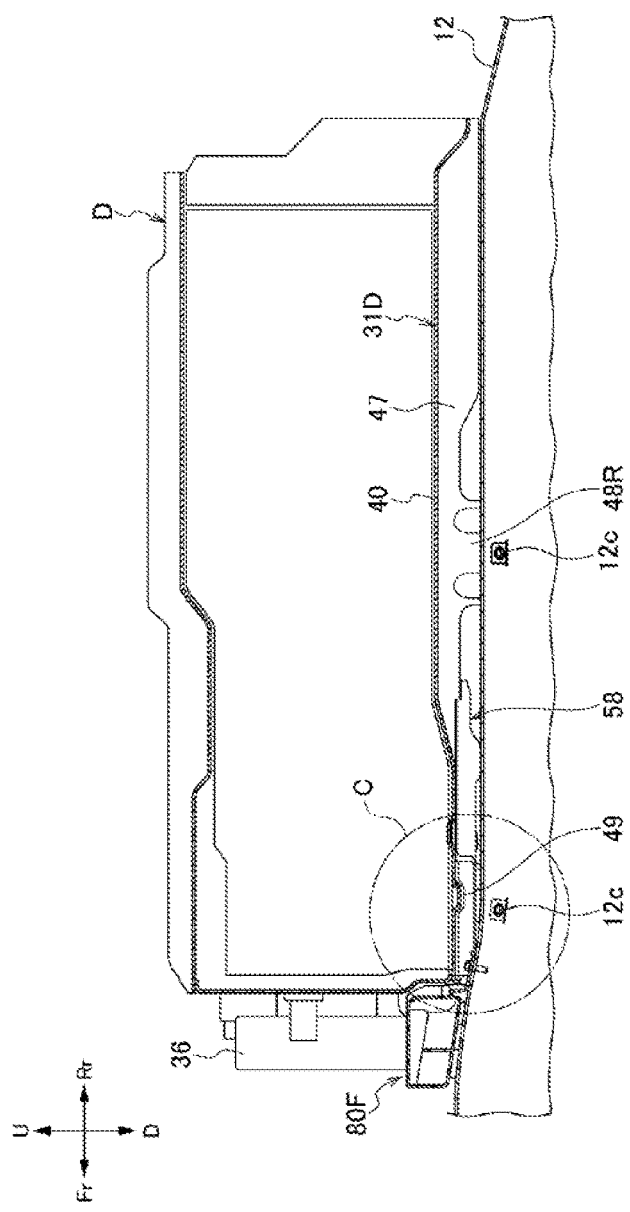
FIG. 12 is a left side view showing a state where the projecting portions of the frame member and recessed portions of the guide member are fitted together whereby the electric device is positioned in a front-rear direction and a height direction.
Figure 13:
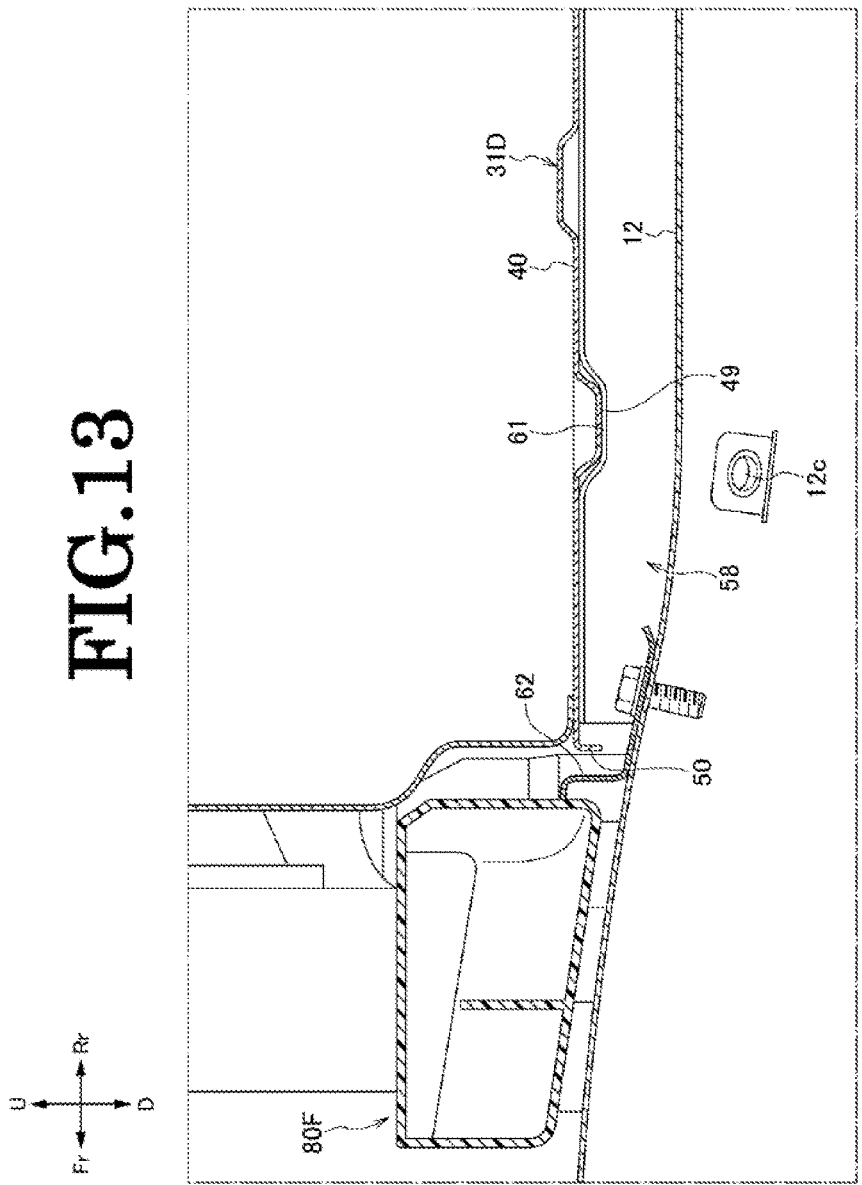
FIG. 13 is an enlarged view of a portion surrounded by a circle C shown in FIG. 12.
Figure 14:
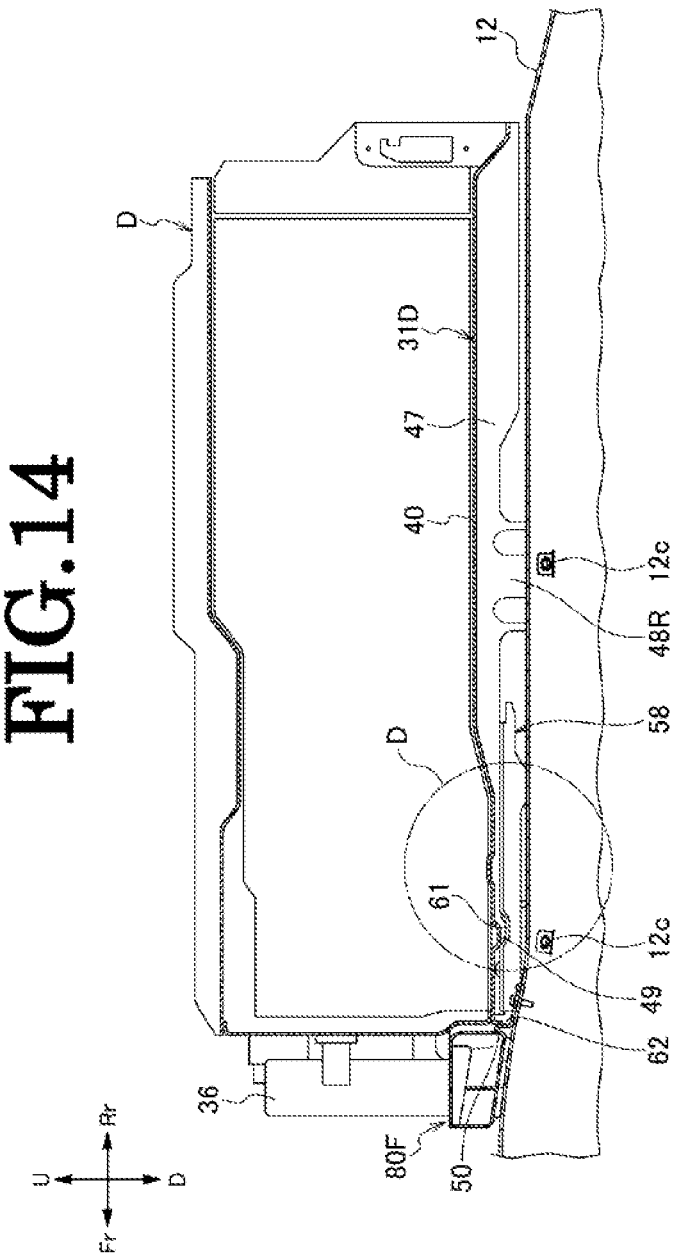
FIG. 14 is a left side view showing a state where the electric device is conveyed forwards beyond a proper installing position whereupon abutment portions of the frame member are brought into abutment with stoppers of the guide member to thereby restrict a further forward movement of the electric device.
Figure 15:
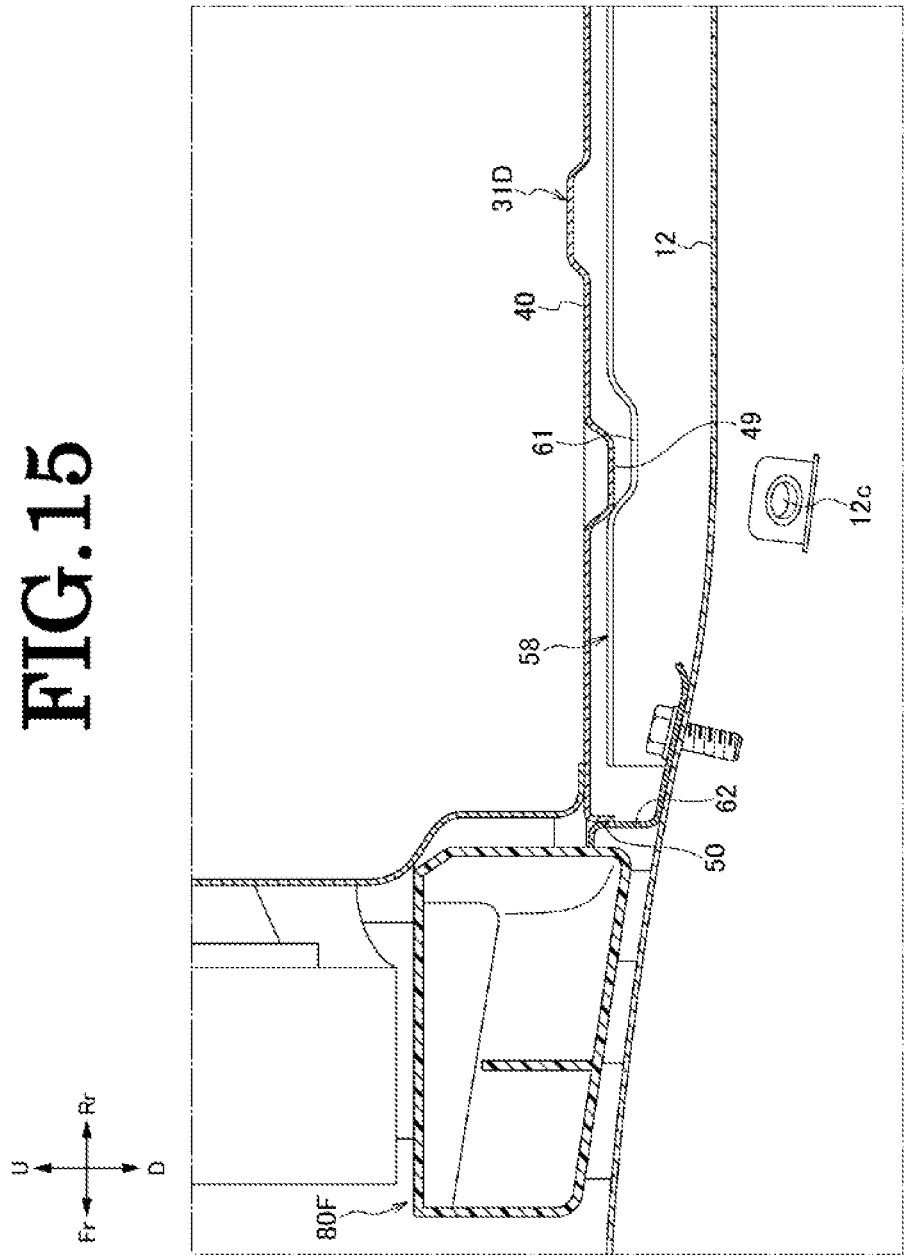
FIG. 15 is an enlarged view of a portion surrounded by a circle D shown in FIG. 14.

Next, a building process of the electric device D on the center tunnel 12 will be described by reference to FIGS. 8 to 15. FIG. 8 is a left side view showing a state where the electric device D is conveyed on to the center tunnel 12, FIG. 9 is a left side view showing a state where the electric device D is lowered so that the projecting portions 49 of the lower frame member 31 are brought into contact with the guide rails 60 of the guide member 58, and FIG. 10 is an enlarged view of a portion surrounded by a circle B shown in FIG. 9. FIG. 11 is an explanatory drawing showing a state where the lower frame member 31D is guided by the guide member 58, so that the electric device D is positioned in the left-right direction. FIG. 12 is a left side view showing a state where the projecting portions 49 of the lower frame member 31 and the recessed portions 61 of the guide member 58 are fitted together whereby the electric device D is positioned in the front-rear direction. FIG. 13 is an enlarged view of a portion surrounded by a circle C shown in FIG. 12. FIG. 14 is a left side view showing a state where the electric device D is conveyed forwards beyond a proper installing position whereupon the abutment portions 50 of the lower frame member 31D are brought into abutment with the stoppers 62 of the guide member 58 to thereby restrict a further forward movement of the electric device D. FIG. 15 is an enlarged view of a portion surrounded by a circle D shown in FIG. 14.

Firstly, as shown in FIG. 8, the electric device D is gripped by, for example, a robot arm in such a state that the electric device D is kept substantially horizontal or is tilted slightly downwards at a front end thereof and is conveyed in a horizontal direction to a position where the front leg portions 48F of the lower frame member 31D pass forwards the left cross member 16L and the right cross member 16R.

Next, as shown in FIGS. 9 and 10, the electric device D is lowered until the projecting portions 49 of the lower frame member 31D come into contact with the upper surfaces of the guide rails 60. As this occurs, as shown in FIG. 11, the position of the electric device D is briefly adjusted in the left-right direction so that the pair of side walls 47 of the lower frame member 31D are positioned transversely outwards of the pair of guide rails 60. With the projecting portions 49 of the lower frame member 31D staying in contact with the upper surfaces of the guide rails 60, the front leg portions 48F and the rear leg portions 48R of the lower frame member 31D are kept staying away from the center tunnel 12, and therefore, the front leg portions 48F and the rear leg portions 48R never constitute an obstacle against a sliding movement of the electric device D, which will be described later.

Then, the electric device D is moved to slide on the pair of guide rails 60 to the front. By doing so, as shown in FIG. 11, the pair of side wall portions 47 of the lower frame member 31D are brought into abutment with the width increasing portions 60b of the guide rails 60. Then, as the electric device D moves further forwards, the electric device D is guided by the width increasing portions 60b to thereby be moved in the left-right direction (upwards in FIG. 11). Namely, the position of the electric device D in relation to the left-right direction is corrected gradually by the width increasing portions 60b, and the pair of side wall portions 47 are then brought into abutment with outer surfaces of the wide width portions 60a of the guide member 58, whereby the electric device D is positioned in relation to the left-right direction.

When the electric device D is caused to slide forwards in that state, as shown in FIGS. 12 and 13, the projecting portions 49 of the lower frame member 31D fit in the recessed portions 61 of the guide member 58, whereby the electric device D is positioned in relation to the front-rear direction and in a height direction. At the same time, the front leg portions 48F and the rear leg portions 48R are brought into abutment with the side inclined surfaces 12b of the center tunnel 12 (refer to FIG. 6). As this occurs, the operator can easily verify that the electric device D has reached the installing position without visually verifying it as a result of the projecting portions 49 of the lower frame member 31D fitting in the recessed portions 61 of the guide member 58. Then, the front leg portions 48F and the rear leg portions 48R are fastened to the side inclined surfaces 12b of the center tunnel 12 with the bolts 64 which are tightened into fastening holes 12c provided in the side inclined surfaces 12b.

As shown in FIGS. 14 and 15, in case the operator erroneously moves the electric device D forwards beyond the installing position by failing to notice the fitting of the projecting portions 49 of the lower frame member 31D in the recessed portions 61 of the guide member 58, the abutment portions 50 of the lower frame member 31D are brought into abutment with the stoppers 62 of the guide member 58 whereby a further forward movement of the electric device D is restricted. By adopting this configuration, even in case the electric device D moves beyond the installing position, there is no such situation that the members which are disposed nearby are damaged by the interference with the electric device D.

As shown in FIG. 6, in such a state that the front leg portions 48F and the rear leg portions 48R of the lower frame member 31D are attached to the side inclined surfaces 12b of the center tunnel 12, the guide rails 60 and the bottom surface 40 of the lower frame member 31D are not in contact, thereby a gap T being defined therebetween. Consequently, the guide rails 60 do not have to hold the electric device D but only have to function to guide the lower frame member 31D, and therefore, the guide rails 60 do not need a rigidity which is strong enough to hold the electric device D.

In this way, since the electric device D is caused to slide to the installing position while being guided by the guide member 58, the moving locus and position of the electric device D can be controlled with good accuracy, and even with only a small gap defined between the electric device D and the peripheral parts disposed near the electric device D, the electric device D can be moved to the installing position with no interference with the peripheral parts without visually monitoring the gap. By adopting the configuration described above, the building work of the electric device D which is a heavy part is improved, and the load of the operator is reduced.

Figure 16:
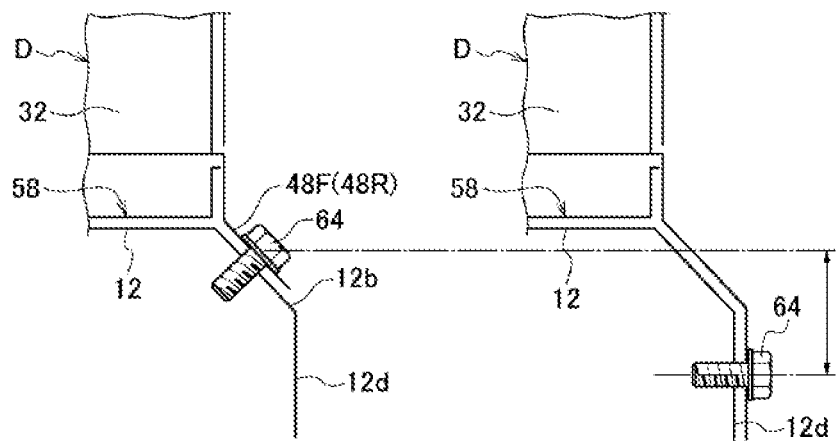
FIG. 16 shows schematic drawings showing various attaching positions by comparison.

FIG. 16 shows schematic drawings showing various attaching positions of the electric device D by comparison. A width of a disposing area of the electric device D including the fastening portions can be narrowed by fastening the high-voltage batteries 32 to the side inclined surfaces 12b of the center tunnel 12 with the bolts 64 as shown in (a) of FIG. 16 (the embodiment), when compares with a case (a comparison example 1) where the electric device D is fastened to vertical side surfaces 12d of the center tunnel 12 with the bolts 64 which are tightened into the vertical side faces 12d horizontally as shown in (b) of FIG. 16. Thus, the electric device D can be disposed in a compact fashion. In this embodiment, the bolts 64 are positioned inwards of the vertical side surfaces 12d which constitute outermost portions of the center tunnel 12, and no bolts 64 protrude transversely outwards from the vertical side surfaces 12d of the center tunnel 12. Thus, the electric device D can be disposed in a compact fashion. Distances from the electric device D to the fastening points become short to thereby improve the supporting rigidity, whereby the movement of the electric device D can be suppressed when the vehicle is involved in a lateral collision. The configuration of this embodiment can easily absorb transverse dimension errors of the center tunnel 12 and the lower flame member 31D.

When compared with a case (a comparison example 2) where the electric device D is fastened to an exclusive attaching bracket 65 with the bolts 64 which are tightened into the attaching bracket 65 vertically as shown in (c) of FIG. 16, too, the configuration of this embodiment can allow the width of the disposing area of the electric device D including the fastening portions to be narrowed, whereby the electric device D can be disposed in a compact fashion. In this embodiment, the necessity of the exclusive attaching bracket 65 is obviated, and the distances from the electric device D to the fastening points become short, the supporting rigidity being thereby improved.

Thus, as has been described heretofore, according to the vehicle 10 of the embodiment, the electric device D which is held on the lower frame member 31D is disposed on the center tunnel 12 which is formed on the floor panel 11 so as to extend in the front-rear direction, and the front leg portions 48F and the rear leg portions 48R which extend obliquely downwards from the bottom surface 40 of the lower flame member 31D are fastened to the side inclined surfaces 12b of the center tunnel 12. Thus, the width of the disposing area of the electric device D including the fastening portions can be narrowed, whereby the electric device D can be disposed on the center tunnel 12 in a compact fashion. The transverse distances to the fastening points become short, whereby the supporting rigidity of the high-voltage batteries 32 is improved. Since the front leg portions 48F and the rear leg portions 48R extend obliquely downwards, the transverse dimension errors of the center tunnel 12 and the lower flame member 31D can easily be absorbed.

The lower frame member 31D holds the high-voltage batteries 32 and the high-voltage system equipment 35. Then, on the bottom surface 40, the pair of left and right rear leg portions 48R are provided below the high-voltage batteries 32, and the pair of left and right front leg portions 48F are provided below the high-voltage system equipment 35. By adopting this configuration, the high-voltage batteries 32 and the high-voltage system equipment 35 are fastened and held strongly and rigidly in the vicinity thereof and hence are protected effectively from a side impact.

The left cross member 16L, the center cross member 16M, and the right cross member 16R are provided between the front leg portions 48F and the rear leg portions 48R. Thus, an impact generated by a lateral collision can be absorbed by the left cross member 16L, the center cross member 16M and the right cross member 16R to thereby suppress the deformation of the front leg portions 48F and the rear leg portions 48R, thereby making it possible to protect the high-voltage batteries 32 and the high-voltage system equipment 35.

The left cross member 16L, the center cross member 16M and the right cross member 16R are connected together via the center tunnel 12 in the transverse direction, and therefore, an impact generated by a lateral collision can be absorbed by the left cross member 16L, the center cross member 16M and the right cross member 16R to thereby suppress the deformation of the front leg portions 48F and the rear leg portions 48R, thereby making it possible to protect the high-voltage batteries 32 and the high-voltage system equipment 35.

The invention is not limited to the embodiment that has been described above and hence can be modified or improved as required. For example, in the embodiment described above, while the electric device D is fixed directly to the center tunnel 12 which is formed on the floor panel 11 with the bolts, the invention is not limited thereto. Thus, a center tunnel cover which covers the center tunnel 12 may be welded to the floor panel 11, and the electric device D may be fixed to the center tunnel cover. Namely, the center tunnel 12 may be formed by only the floor panel 11 or an integrally formed part in which the floor panel 11 is covered by the center tunnel cover. In the case of the integrally formed part in which the floor panel 11 where the center tunnel 12 is formed is covered by the center tunnel cover, the guide member 58 is fixed to an upper surface of the center tunnel cover. The utilization of the center tunnel cover obviates the necessity of forming bolt holes for fixing the electric device D in the floor panel 11. Additionally, the center tunnel cover also functions as a reinforcement member.

In the embodiment described above, the high-voltage batteries 32, the ECU 41, and the high-voltage system equipment 35 are held by the frame member 31 so as to be made into the single unit. However, the invention is not limited thereto, and at least the high-voltage batteries 32 only have to be held by the frame member 31.

This patent application is based on Japanese Patent Application (No. 2014-227047) filed on Nov. 7, 2014, the contents of which are incorporated herein by reference.

DESCRIPTION OF REFERENCE NUMERALS AD CHARACTER

10 Vehicle
11 Floor panel
12 Center tunnel
12b Side inclined surface (inclined surface of center tunnel)

13L Left side sill
13R Right side sill
16L Left cross member (cross member)
16M Center cross member (cross member)
16R Right cross member (cross member)
31 Frame member
31D Lower frame member
32 High-voltage battery
33 Junction box
34 Converter
35 High-voltage system equipment
40 Bottom surface (bottom portion)
48F Front leg portion (second leg portion)
48R Rear leg portion (first leg portion)
D Electric device

The invention claimed is:

1. A vehicle comprising:
   a center tunnel which is formed on a floor panel so as to extend in a front-rear direction;
   a high-voltage battery which is disposed on the center tunnel; and
   a frame member which holds the high-voltage battery, wherein
   the frame member comprises:
      a pair of left and right side wall portions which extend downward from opposite sides of a bottom portion of the frame member in a transverse direction; and
      a pair of left and right leg portions which extend obliquely downward from the pair of left and right side wall portions, and wherein
      the frame member is fastened to inclined surfaces of the center tunnel via the pair of left and right leg portions, and
      a space which accommodates a cell voltage sensor is formed between the bottom portion of the frame member and the center tunnel.

2. The vehicle according to claim 1, wherein
   the frame member holds a high-voltage system equipment which is disposed either forwards or rearwards of the high-voltage battery together with the high-voltage battery, and wherein
   the pair of left and right leg portions include:
      a pair of left and right first leg portions which are disposed below the high-voltage battery; and
      a pair of left and right second leg portions which are disposed below the high-voltage system equipment.

3. The vehicle according to claim 2, wherein
   a cross member is provided between the pair of left and right first leg portions and the pair of left and right second leg portions.

4. The vehicle according to claim 3, wherein
   the cross member comprises:
      a center cross member which is disposed in the center tunnel;
      a left cross member which connects a left side sill and the center tunnel together; and
      a right cross member which connects a right side sill and the center tunnel together, and wherein
      the left cross member, the center cross member, and the right cross member are connected together via the center tunnel in a transverse direction.

5. The vehicle according to claim 1, wherein
   the frame member is fastened to the inclined surfaces of the center tunnel via the pair of left and right leg portions by means of a fastening member, and wherein
   the fastening member is positioned inwards of an outermost portion of the center tunnel in a transverse direction.

* * * * *